F. BRUCKMANN, Jr. & O. DEMPEWOLF.
CAN HEADING MACHINE.
APPLICATION FILED FEB. 10, 1912.

1,146,474.

Patented July 13, 1915.
7 SHEETS—SHEET 1.

WITNESSES

INVENTORS
FRANZ BRUCKMANN JR.
AND OTTO DEMPEWOLF.
BY Miller & White
their ATTORNEYS F. BRUCKMANN, Jr. & O. DEMPEWOLF.
CAN HEADING MACHINE.
APPLICATION FILED FEB. 10, 1912.

1,146,474.

Patented July 13, 1915.
7 SHEETS—SHEET 5.

WITNESSES
N. G. Prost.
H. A. Scholten

INVENTORS
Franz Bruckmann Jr.
and Otto Dempewolf
By Miller & White
their ATTORNEYS

UNITED STATES PATENT OFFICE.

FRANZ BRUCKMANN, JR., AND OTTO DEMPEWOLF, OF BRUNSWICK, GERMANY.

CAN-HEADING MACHINE.

1,146,474.  Specification of Letters Patent.  Patented July 13, 1915.

Application filed February 10, 1912. Serial No. 676,811.

*To all whom it may concern:*

Be it known that we, FRANZ BRUCKMANN, Jr., and OTTO DEMPEWOLF, subjects of the German Empire, and residents of Brunswick, Germany, have invented certain new and useful Improvements in Can-Heading Machines, of which the following is a specification.

The invention relates to a machine for applying the heads to sheet metal can bodies and for seaming them into place, particularly to seaming them in such a way that the use of solder will not be required.

The present improvements relate in a general way to the principle of operation involving a tool wheel which has a number of tool surfaces successively acting on the work, such as set forth in the prior patent to Bruckmann and Dempewolf, No. 895067, dated August 4th, 1908, although this application involves other features of importance not necessarily related to the said principle of the tool wheel.

The machine possesses many advantageous features which will be set forth at length in the following description, wherein we shall outline in full that form of embodiment of the invention which we have selected for illustration in the drawings accompanying and forming part of the present specification.

The novelty of the invention will be included in the claims succeeding said description.

It is to be understood that we do not restrict ourselves to the showing made by such drawings and description as we may adopt many variations within the scope of the invention as expressed in said claims.

Reference is now had to the accompanying drawings which represent as an example only the preferred manner of practically embodying the invention.

In said drawings

The apparatus is provided with a suitable frame, the details of which are not important, provided the frame is so shaped and disposed that it will properly carry the various moving elements of the machine. According to the example here given, the frame has two main or side portions 25 carrying the principal moving elements of the mechanism, among which are the main shaft 26 extending completely across the frame and the various shorter shafts, to be hereinafter particularly described, by which the seaming heads and blocks are carried. The main shaft 26 is preferably horizontally disposed so that the rotating elements lie in vertical planes. This allows the can parts to be fed by gravity and avoids the provision of mechanical devices for feeding them.

Figure 1:
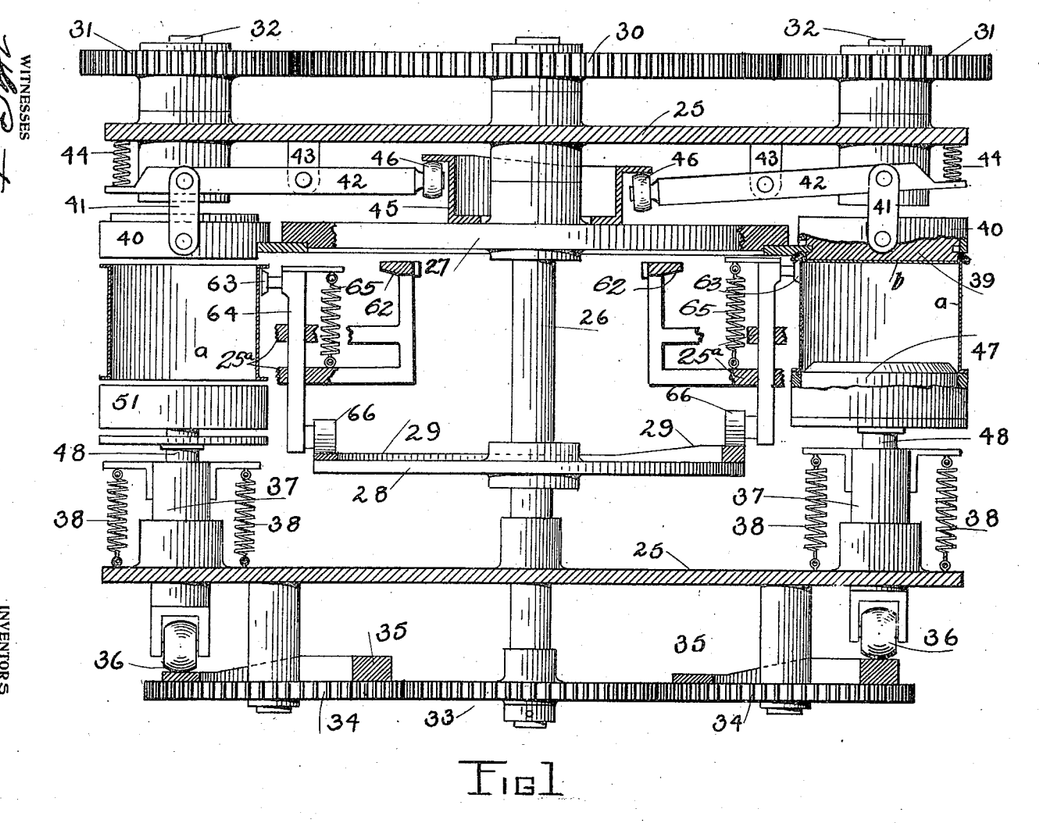
—Figure 1 is a plan view of the machine with parts in section showing the position and arrangement of the various parts.

The shaft 26 carries the seaming wheel 27 which is secured to the shaft and a wheel or disk 28 with a cam track 29 thereon. Said shaft also carries a spur gear 30 which is fastened to the shaft and meshes with pinion gears 31, which are attached to the arbors 32 of the seaming heads. The gears 31 are of smaller diameter than gear 30 so that the seaming heads make several revolutions for one revolution of the seaming wheel. The seaming wheel 27 is provided on its periphery with tool surfaces by which the seaming is effected in the manner broadly set forth in the prior patent to Bruckmann and Dempewolf as hereinbefore referred to. An important advantage of this seaming wheel is that a number of seaming stations may be located around its periphery. This allows a number of separate seaming operations to be carried on simultaneously and accordingly increases the capacity of the machine. In Fig. 1, two seaming stations are illustrated, but they may be in any number from one to any reasonable number within the limit of the size of the seaming wheel without departing from the principle of our invention. At each seaming station there is provided a seaming head and a holding chuck with their appurtenances of which gears 31 and arbors 32 are parts. The main shaft 26 also carries, at the end opposite the spur gear 30, a spur gear 33, which meshes with similar gears 34, one for each seaming station. Accordingly, Fig. 1 illustrates two gears 34. These gears are provided with cam tracks 35, on which run rollers 36 carried by the plunger shafts 37 of the seaming blocks. Said plunger shafts are mounted to slide in one side member of the frame and held against the cam tracks by springs 38. Gears 33 and 34 are of the same size so that the seaming block completes one cycle of movement for every revolution of the seaming wheel.

The seaming heads 39 are round or otherwise shaped to correspond with the cross-sectional form of the can and are mounted fast upon and rotate with the arbors 32. Said seaming heads carry ejector bands 40 which are loose thereon and within which the seamer heads revolve. The ejector bands are articulated by links 41 to levers 42, which levers are fulcrumed on the frame at 43 and held by springs 44 in contact with the cam 45. Rollers 46 are provided at this point to reduce friction. The cam 45 is annular and is fastened to turn with the seaming wheel 27. In operation the ejector band 40 is periodically moved forward and backward to allow engagement of the can parts with the seamer head and to eject the seamed can from such head, all of which will fully appear hereinafter.

Coacting with each seamer head and arranged opposite the same in axial line therewith are the holding chucks 47. These are fastened on spindles 48 which as shown best in Figs. 2 and 3 turn loosely in the spindles 37 and have thrust bearing against slides 49 mounted in the hollow spindles 37 and pressed forward by springs 50. The face of the holding chuck is slightly conical so as to insure its proper entry into the can body and the holding chuck is surrounded by a cup 51 fitting loosely thereon and normally held in the advanced position shown in Fig. 2 by springs 52 and 53, but said cup is allowed, by the yielding of the springs, to recede from its advanced position under the pressure of the can body and take the retracted position shown in Fig. 3, which allows one end of the can body to be properly engaged with the holding chuck, while the seaming operation is in progress.

Figure 2:
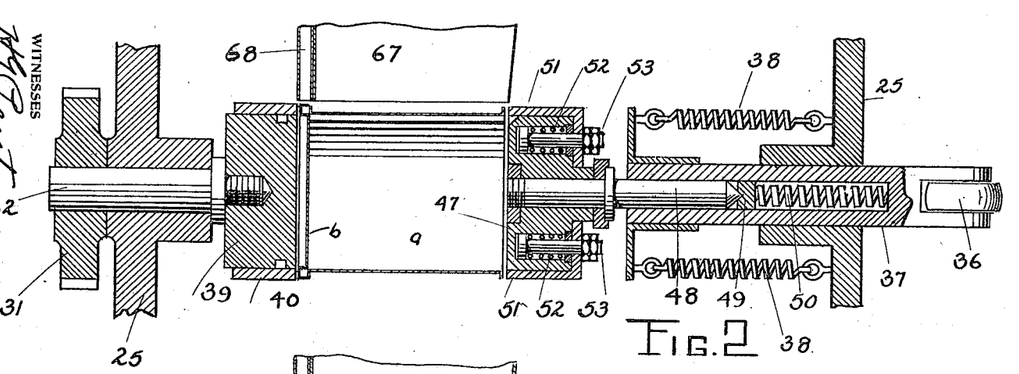
Fig. 2 is an enlarged section of one of the seaming heads at rest.
Figure 3:
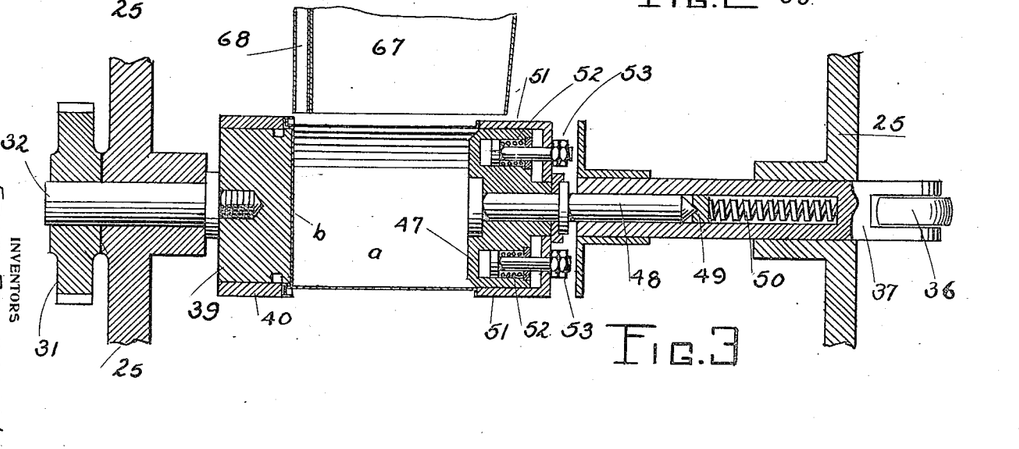
Fig. 3 is a similar view of one of the seaming heads in operation.
Figures 4, 5, 6, 7, 8, 12:
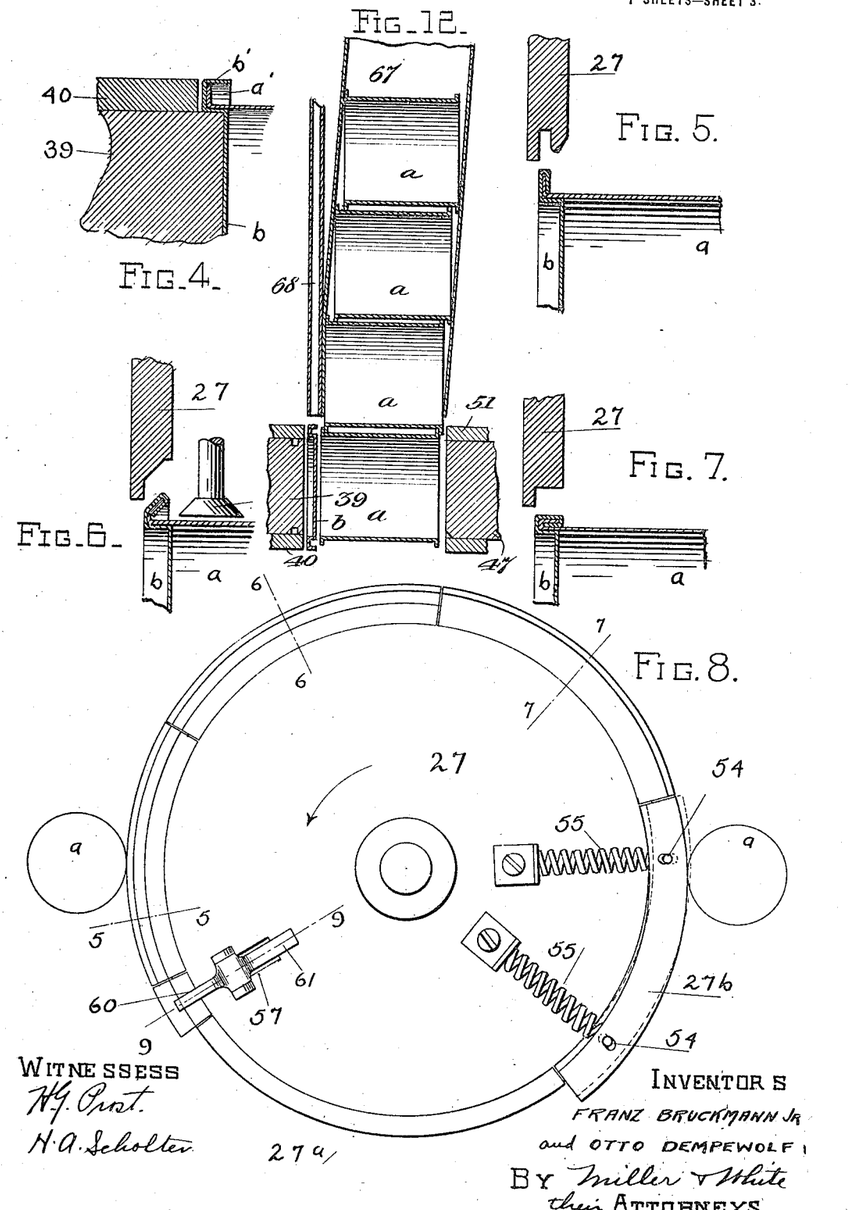
Fig. 4 is a detail section of the body and head before the seaming operation.
Fig. 5 is a similar view showing the first step in the operation of seaming and a section of a fragment of the tool for performing it on the line 5—5 of Fig. 8.
Fig. 6 is a similar view showing the second step in the seaming operation and fragments of the tools for performing it taken on the line 6—6 of Fig. 8.
Fig. 7 is a similar view of the third step in the seaming operation and a section of a fragment of the tool for performing it on the line 7—7 of Fig. 8.
Fig. 8 is a diagrammatic side view of the seaming wheel.
Fig. 12 is an enlarged section of the can body and can head chutes showing their relation to the seaming heads.

In Figs. 2 and 3 the can body $a$ is illustrated in position between the seaming head and chuck and the head $b$ is also illustrated in its characteristic position on the seaming head. The detail view Fig. 4 shows these parts on a larger scale in which view the flange $a'$ of the can body clearly appears as seated in the grooved or channeled periphery $b'$ of the cover $b$. Fig. 4 also illustrates a fragment of the seaming head 39 and the ejector ring 40, all of the parts there appearing in the position which they assume at the beginning of the seaming operation. In Fig. 2 the seaming head and chuck are about to engage the can parts, while in Fig. 3 the engagement is complete, and the can is held firmly for seaming and the seaming operation is about to begin.

Figure 20:
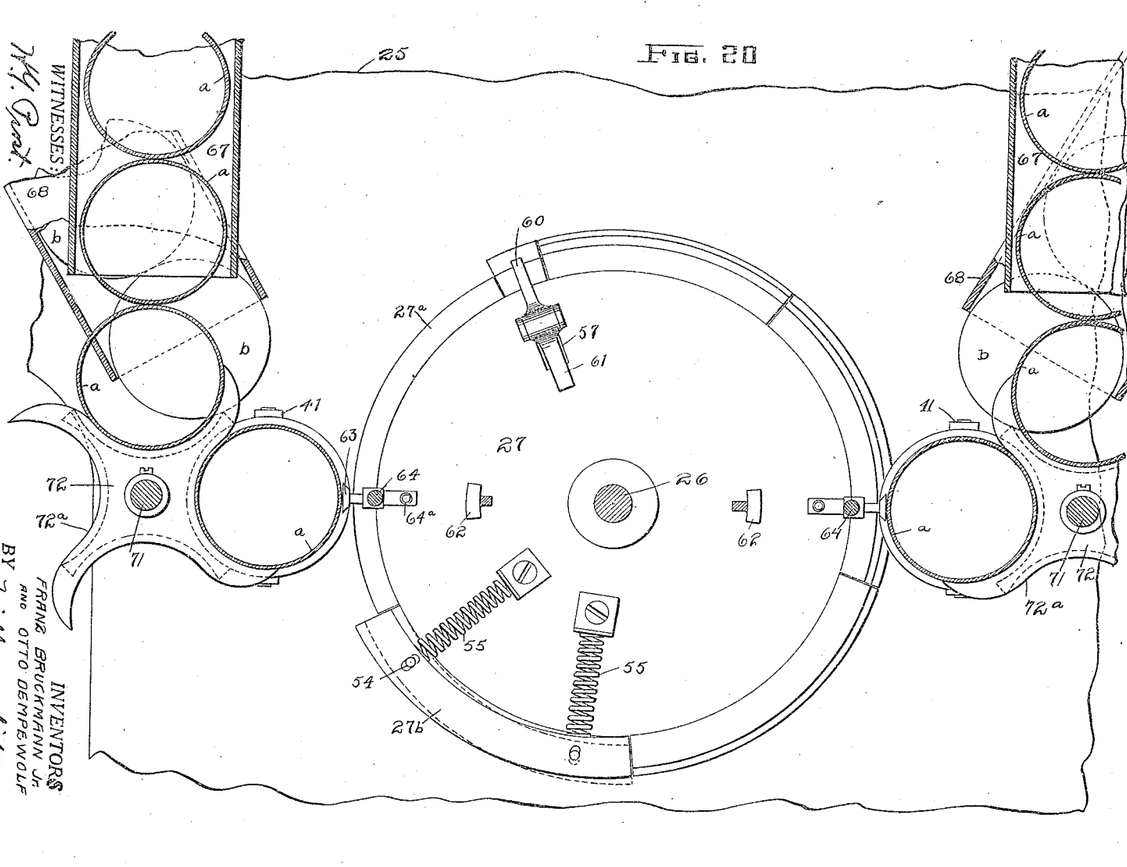
Fig. 20 is a vertical section through part of the machine taken through the can bodies in Fig. 1.

Fig. 8 is a side view of the seaming wheel showing somewhat diagrammatically the manner in which said wheel is laid out and Figs. 5, 6 and 7 showing stages of the seaming operation, are respectively sections of the seaming wheel at points 5—5, 6—6 and 7—7. It will be seen from these views that the seaming wheel 27 has its periphery provided with various formations, constituting tool surfaces, which are so shaped that they will act upon the can parts; first to bend the downward projecting lip on the edge of the can head inward from the position shown in Fig. 4 to that shown in Fig. 5; second, to bend down the three thicknesses of metal projecting outward in Fig. 5 to the intermediate bent position shown in Fig. 6, and third, to bend in said three thicknesses of metal from the position shown in Fig. 6 to the final or seamed position shown in Fig. 7. These tool surfaces on the seaming wheel 27 are separately formed and are attached to the seaming wheel and arranged successively thereon in such manner that the above-described operations are successively performed. This leaves a segment of the seaming wheel, indicated by $27^a$ in Fig. 8 and Fig. 20, which is without tool surfaces and which does not touch the can. The purpose of this is to allow the movement of the can parts into seaming position, the operation being so timed, as will hereinafter fully appear, that the can bodies and heads successively drop into position between the seaming heads and chucks at the time that the blank segment indicated by 27ª of the seaming wheel is opposite a particular pair of seaming heads and chucks. For the purpose of finally compressing the seam and causing it to assume the most compact form possible without fracturing the metal a segment 27ᵇ of the seaming wheel constituting a part of the tool surface indicated in Fig. 7, is rendered radially movable on the seaming wheel. This may be effected in any desired manner, for example, by the pin and slot connection 54. This movable segment 27ᵇ is pressed outward by stout springs 55. The result of this operation is that the rigid portion of the tool surface, shown in Fig. 7, first engages the seam and moves it into approximate final form, which operation is followed by engagement with the seam of the movable segment 27ᵇ forming a continuation of the tool surface shown in Fig. 7. Here the heavy springs 55 give the seam its final compression without however subjecting it to such unyielding pressure as might break or injure the metal of which the seam is formed. In the formation of this seam, as above described, it is in some cases desirable to assist the rapid automatic action of the seaming wheel. First, during the operation of bending in the downward projecting lip from the position shown in Fig. 4 to that shown in Fig. 5, and second, to assist in properly bending down the three thicknesses of metal from the position shown in Fig. 5 to that shown in Fig. 6. In the first case, the danger is that the downwardly projecting lip is sometimes liable to be moved into actual contact with the side of the can body producing a bungled seam, and in the second case the danger is that the three thicknesses of metal will separate from close contact with each other when being bent down to the position shown in Fig. 6. To overcome the first danger, I provide the devices illustrated in detail in Figs. 9 and 10, and, for the second case, I provide the devices illustrated in Fig. 1 and in detail in Fig. 11.

Figure 9:
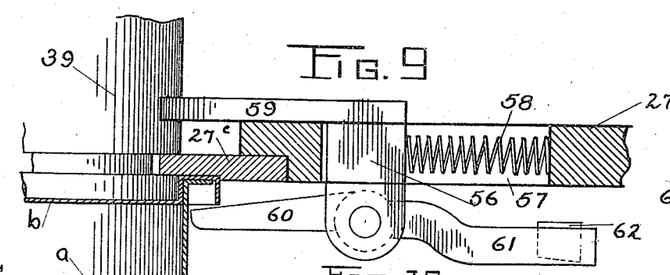
Fig. 9 is a detail of the bending finger on the seaming wheel, the wheel being shown in section and the finger in inoperative position.
Figure 10:
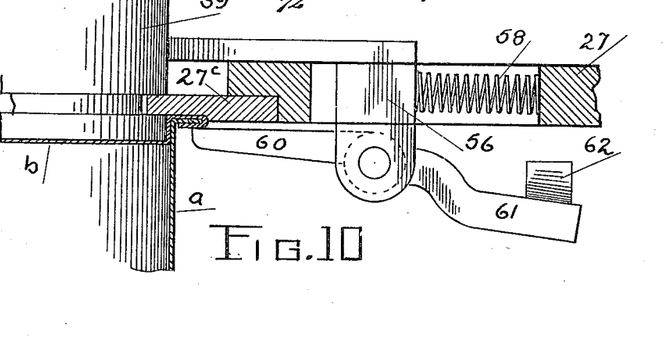
Fig. 10 is a similar section showing the bending finger in operation on the flange of the cover.

Referring now particularly to Figs. 9 and 10, the seaming wheel is illustrated in part in these views. These views also show a fragment of the head 39 and parts of the can $a$ and cover $b$. In Fig. 9 the head is shown merely engaged with the can body, while in Fig. 10 the marginal lip of the head has been bent up under the flange on the can body. In these figures the projecting portion 27ᶜ represents a part of one of the seaming tools, parts of which are also shown and described in connection with Figs. 5, 6 and 7. 56 indicates a slide carried in a slideway 57 in the seaming wheel and pressed outward by a spring 58. This slide 56 carries a shoe 59 which slides along one face of the seaming wheel and is adapted to engage the head 39 or any other relatively stationary part at the time the slide 56 moves opposite the can being seamed, so that the slide 56 is movable radially on the seaming wheel. On the side of the slide opposite the shoe 59 a pincher finger 60 is pivoted, which finger is adapted to act on the depending lip or flange of the head $b$ in the manner which will be hereinafter described. Attached to said pincher finger 60 is an arm 61 which moves with the finger and the seaming wheel and is pivoted to engage a cam 62 which is formed on the machine frame and located in the path of the arm 61 in such position that it is engaged by the arm 61 at the time when the pincher finger underlies the flange on the can cover. This cam 62 may be placed in any desired situation on the frame and the frame may be formed accordingly. The only essentiality is that as the parts 60 and 61 move with the seaming wheel and approach the can for the purpose of performing the operation illustrated in Fig. 5, the cam 62 will be engaged by the arm 61 and the pincher finger 60 thrown toward the tool 27ᶜ engaging the depending flange on the periphery of the head and pressing said depending flange inward and upward to the position shown in Fig. 10. Simultaneously with this operation the shoe 59 strikes the head 39 or any other stationary or relatively stationary member provided for this purpose and moves the slide 56 with its connections inward radially of the seaming wheel. The net result of these combined movements therefore is that the pincher finger 60 moves upward and inward simultaneously, striking the depending flange or the can head and bending it inward and upward. This movement is combined with a simultaneous movement of the pincher finger radially inward toward the center of the seaming wheel so that by means of the pincher finger the depending flange on the can head is pressed upward against the flange on the can body and simultaneously subjected to an outward drawing pressure which insures that the inwardly bent flange on the can head does not engage and bend over against the side of the can body, but, on the contrary, assumes the true position as shown in Figs. 5 and 10. The pincher finger occupies on the seaming wheel 27 a position corresponding to the line 9—9 in Fig. 8 and it therefore immediately precedes the portion of the seaming wheel bearing the tool shown in Fig. 5, the relative position of which tool is indicated by the line 5—5 in Fig. 8. Therefore, at the inception of the operation the pincher finger performs the function above-described and is immediately followed by the tool shown in Fig. 5 which takes up the work begun by the pincher finger and rolls around the under circumference of the can completing the operation of bending in the flange on the head in the manner illustrated in Fig. 5. After this, operations disclosed by Figs. 6 and 7 follow in succession.

Figure 11:
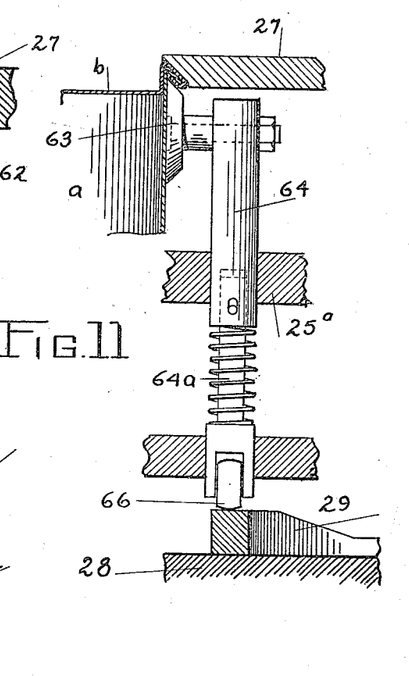
Fig. 11 is an enlarged detail of the backing or anvil wheel, also showing part of the seaming wheel in section on the line 6—6 of Fig. 8.

Referring now particularly to Figs. 1, 6 and 11, it will be seen that in the operation of bending down the three thicknesses of metal to the position shown in Figs. 6 and 11, there would ordinarily be danger of separating these three thicknesses and forming an irregular seam. To obviate this possible difficulty a backing wheel 63 has been provided which is conical in form and arranged, during the operation of the tool shown in Fig. 6, to move up under the seam so that the said tool bends the seam down and simultaneously rolls it flat against the rigid backing roller. The backing roller may be mounted in any manner desired and it is arranged automatically to move into operation during operation of the tool illustrated in Fig. 6 and to move back automatically at the end of that period and before the operation of the tool illustrated in Fig. 7 is performed. For accomplishing this purpose we have here shown a slide 64 which is mounted in suitable frame parts 25$^a$ indicated in Figs. 1 and 11 and which is actuated by a spring 65 holding the backing roller out of action until overcome by the positive operation of the cam 29 on which the roller 66 of the slide 64 runs. This cam is so arranged that it throws the slide 64 toward the seaming wheel during the period of the operation shown in Fig. 6, after which roller 66 runs off of the cam 29 and the spring returns the slide to the inactive position of the backing roller. As will be understood there is one backing roller 63 for each station. Since two seaming stations are illustrated in Fig. 1 there is a corresponding illustration of two backing rollers. 64$^a$ in Fig. 11 indicates a spring interposed between two connected sections of the slide 64 to allow them to yield slightly.

Figure 16:
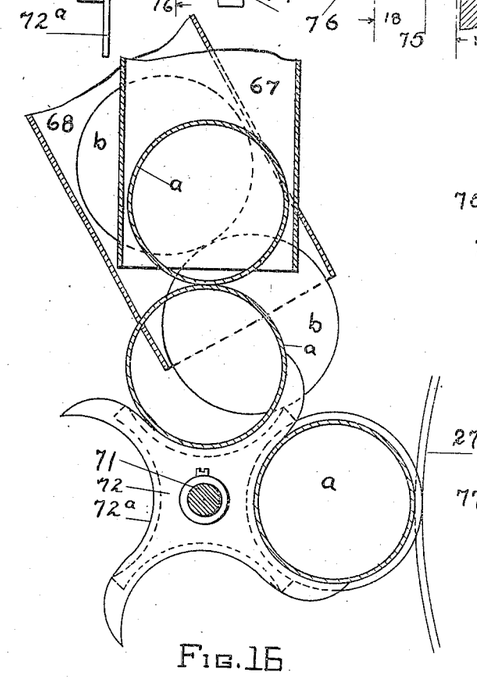
Fig. 16 is a section taken on line 16—16, Fig. 15 showing the can body and cover feeding apparatus and the can body and cover chutes.
Figure 17:
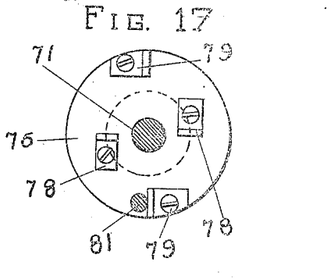
Fig. 17 is a sectional elevation on the line 17—17 of Fig. 15.
Figure 18:
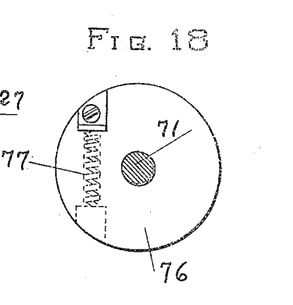
Fig. 18 is a sectional elevation on the line 18—18 of Fig. 15.

To each seaming station of the machine two chutes lead, one for the can bodies and one for the heads. According to the form of the invention here illustrated, the cans are seamed at one end only and if it be desired to seam them at the opposite end they may be passed through the machine a second time. In Figs. 12 and 16 the arrangement of these chutes is illustrated, Fig. 12 being a side view and Fig. 16 an end view.

In Fig. 12 fragments of the seaming heads 39 and the holding chucks 47 are illustrated. In this view the body chute 67 and the head chute 68 are located behind the seaming heads, the can body and head in place between the heads being in front of the other cans in the chute. This arrangement of the chutes and the heads is better shown in Fig. 16 which will be described more fully hereinafter. The body chute 67 does not extend in a vertical direction, but is inclined slightly so that the can bodies do not lie directly over each other, but stand slightly out of line so that there will be no interference of the flanges with each other when the bottommost body is removed from the chute and placed in position for the seaming operation. The motion of the holding chuck 47 toward the seamer head causes the can in position to move horizontally and its flanged end is introduced into the channeled edge of the head after which the two parts move as a unit toward the seamer head and finally assume the relation shown in Fig. 3.

Figure 13:
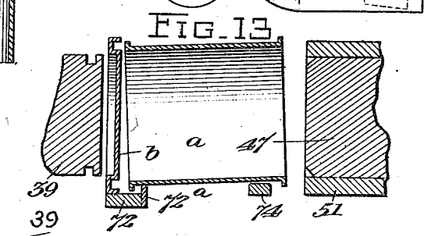
Fig. 13 is a detail section showing the preferred manner of engaging the bodies and heads with each other.
Figure 14:
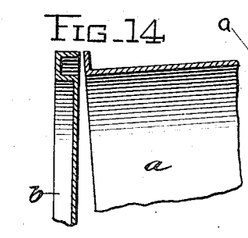
Fig. 14 is an enlarged detail also showing the engagement of these parts.
Figure 15:
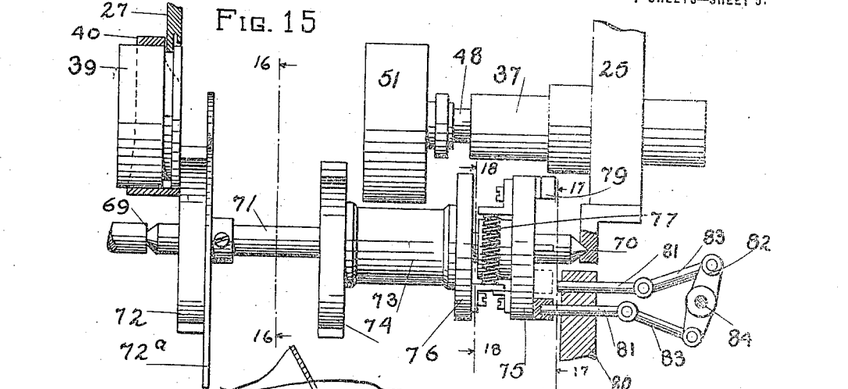
Fig. 15 is a plan view of the seaming heads and the means for feeding can bodies and covers thereto.

Devices are provided for controlling the movement of the can bodies and heads in the machine as well as for so actuating the parts of either of them so as to insure greater certainty of engagement of the body with the head in accordance with the foregoing description. This is fully illustrated in Figs. 13 and 14. If the can body were moved on a true axial line squarely against the can head the parts might not always engage truly and without danger of bending. If, however, the can body is tilted slightly as indicated in Fig. 13 one point on its periphery is first engaged with the head and proper reception of the flange of the body in the curved edge of the head is thereby insured. Then as the movement of the can body is continued and said body is simultaneously returned to true axial position the complete engagement of the two parts of the can will be an easy matter. Fig. 14 illustrates in an enlarged section the tilted position of the can and consequently the easy engagement of the parts. For accomplishing this purpose of controlling the movement of the can parts and preventing them from falling when the seamer heads and chucks are separated, the mechanism illustrated in Figs. 15, 16, 17, 18 and 19 has been adopted. In Fig. 15, 25 indicates a fragment of the frame carrying one of the holding chuck spindles 37 on which the seamer block 47 and cup 51 are carried through the medium of the before described spindle 48. Fig. 15 also illustrates the seamer head 39 with the ejector ring 40 and a fragment of the seamer wheel 27 with one of its tools in operative position.

Mounted to turn freely between the bearings 69 and 70, suitably sustained on the framing is a spindle shaft 71 on which are arranged the four-armed star wheels 72—72$^a$ and 74. The star wheels 72 and 74 are spaced apart a distance somewhat less than the can body so that they support the opposite ends of the can and hold it in proper position. The star wheel 72 supports the can cover and is engaged by the flange on the end of the can body. The star wheel 72ª is attached to the spindle or to star wheel 72 and is of such dimensions that it bears against the can body proper. This star wheel 72ª is provided with long arms curved in the curvature of the can body so that it may support the can body when it is moved into position at the seaming station. The spindle 71 is located directly beneath the can chute 67 and to one side of and preferably in horizontal line with the seaming heads. The spindle shaft 71 also carries a sleeve 73. This is loose on the shaft and has at one end the 4-armed star wheel 74. The star wheel 74 is adjacent the holding chuck and serves to sustain the adjacent end of the can as shown in Fig. 13.

75 indicates a disk which is keyed to the shaft 71 and connected with the sleeve 73 through the medium of a flange 76 and a light spring 77; the parts being so proportioned and disposed that the star wheel 72 is held in advance of the star wheel 74, thus raising, see Fig. 13, the end of the can adjacent to the holding chuck and bringing about the tilting thereof as before explained.

The head chute 68 is arranged at an angle to the can chute, as shown in Fig. 16 and so placed that the leading head bears against one point of the star wheel 72, the weight of the heads in the chute pressing against the star wheel acting to turn the star wheel to throw the can and head into position at the seaming station. When the can and head are engaging the star wheel as shown in Fig. 16 and the wheel is released so that it may turn through ninety degrees, this can and head are moved into position between the seaming head and chuck and the remaining cans and heads drop down one position and engage the star wheels.

When the can body and head are first moved into position between the seaming head and chuck, the can body is tilted owing to the peculiar position of the star wheels, but as the holding chuck moves up and forces the can body home straightening it out along the axial line of the seamer head and chuck, the spring 77 gives and allows the star wheel 74 to rotate slightly into line with star wheel 72.

As has been said, the star wheels 72 and 74 turn by gravity to allow the movement of the cans, and since the cans rest momentarily during the seaming operation the motion of the star wheel must be intermittent. To accomplish this automatically the face of the disk 75, opposite the sleeve 73, is provided with tappets 78 and 79 of which, according to the construction here shown, there are four—two designated 78 and two designated 79. The tappets 78 are in a circle concentric to the shaft 71. This circle is smaller in diameter than that of a second circle in which are located the tappets 79.

A suitable frame member 80 carries two stop pins 81 respectively arranged in the line of the said circles on the disk 75 and connected with each other through a double crank 82 and links 83 so that upon rocking the shaft 84 upon which said crank is mounted the stop pins alternately move in and out of the paths of said tappets 78 and 79.

Figure 19:
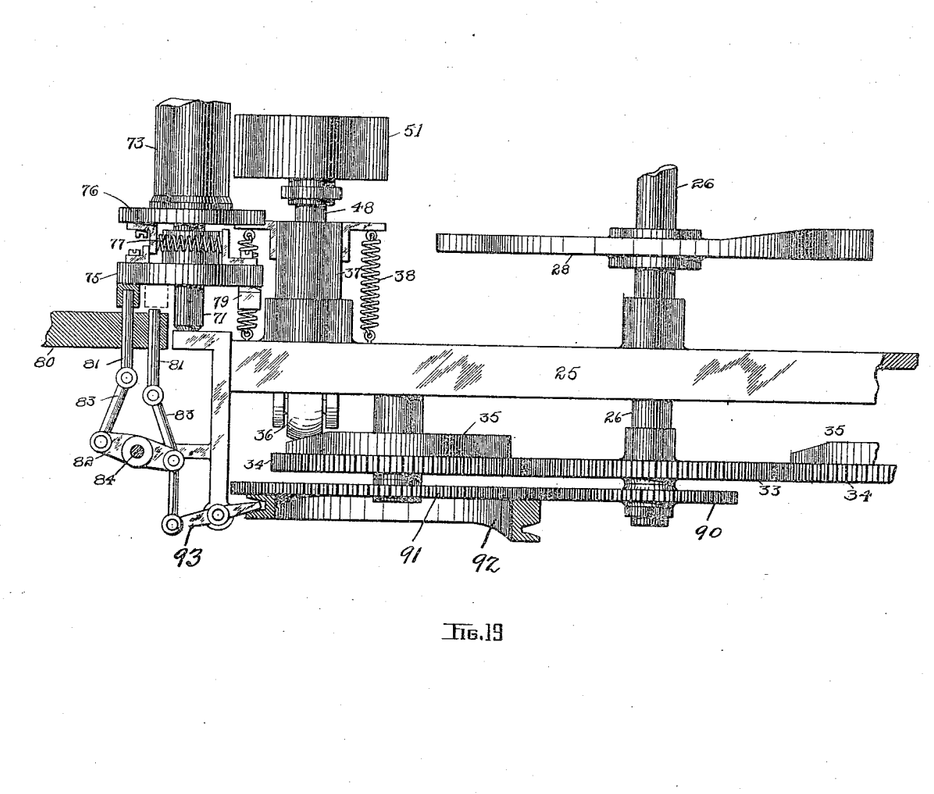
Fig. 19 is a fragmentary detail in plan, showing the can body and head feed timing means.

The double crank 82 is connected to a moving part of the machine so that it operates the pins 81, once for each revolution of the seaming wheel, to allow the above named step by step rotation of the shaft 71. One form of mechanism for accomplishing the movement of the crank 82 is shown in Fig. 19. In this construction, a gear 90 secured to shaft 26 engages a gear 91 loosely mounted on the shaft carrying gear 34. The gear 90 is one-half the size of gear 91 so that gear 91 makes one complete revolution for two complete revolutions of the seaming wheel. Secured to gear 91 is a cam 92 which is engaged by a lever 93, which is connected to the crank 82. The cam 92 is so arranged that it produces a movement of the pins 81 immediately after the holding chucks 47 have moved to release the can.

The organized operation of the apparatus may be traced as follows: Disregarding, for purpose of simplicity or description, the fact that in practice the machine will be equipped with a number of seaming stations and confining the description to the operations at one seaming station, upon starting the motion of the shaft 26 the seaming wheel 27 and the disk 28 rotate continuously. By reason of the gearing as described the seaming head also rotates continuously and the cam 35 turns to impart periodic reciprocations of the holding chuck. The can bodies and heads move by gravity through their respective chutes controlled by the step by step rotation of the star wheels 72 and 74. At the time that the can body and its head reaches the position shown in Figs. 2 and 13 the arrangement of the cam 35 causes the holding chuck to be moved toward the can body so that the can body is pushed into the head as described and the parts then take the position shown in Fig. 3. At this instant the seaming wheel presents to the can the neutral segment indicated by the bracket 27ª (see Fig. 8); instantly thereafter the seaming devices go into operation and the can head is clenched and seamed to the body in the manner previously described. As this operation is repeated and the seaming wheel again presents its segment indicated by the bracket 27ª to the seaming station, the seamed can is released by the withdrawal of the holding chuck and the operation of the ejector ring. The star wheels then rotate to place the next can body and head in position and the seamed can drops out of the seaming position. The previously retracted holding chuck then returns to its active position and the operation is repeated.

Power to drive the machine is applied to a drive shaft (not shown) which is arranged either above or below the shaft 26 and which is connected to gear 30 by means of a pinion, not shown. The drive shaft is provided with the customary belt drive.

Having thus described our invention what we claim as new and desire to secure by Letters Patent of the United States is:

1. In a machine for making tin cans, the combination of means for engaging and holding engaged a can body and its head and seaming wheel with a plurality of tools rigidly fixed thereon adapted to act on said can parts to seam the head to the body, and a movable section and means for yieldingly pressing it into action.

2. In a can seaming machine, the combination of means for supplying the bodies and heads, a holding chuck, means for reciprocating the chuck to move a body and head into engagement, a seaming head against which said can parts are moved by the holding chuck, means for rotating the seaming head, an ejector ring on the seaming head, means for operating said ring to eject the seamed can, a seaming wheel with a plurality of successively acting tools thereon adapted to form the seam, means for mounting and rotating said seaming wheel and means for controlling the movement of the bodies and heads to and from the seaming station.

3. In a can seaming machine, the combination of means for supplying the bodies and heads, a holding chuck, means for reciprocating the chuck to move a body and head into engagement, a seaming head against which said can parts are moved by the holding chuck, means for rotating the seaming head, an ejector ring on the seaming head, means for operating said ring to eject the seamed can, a seaming wheel with a plurality of successively acting tools thereon adapted to form the seam, means for mounting and rotating said seaming wheel and means for controlling the movement of the bodies and heads to and from the seaming station, a backing wheel adapted to be moved against the seam during its formation, a means for periodically moving said wheel in and out of operation, a pincher finger serving to start the seaming operation and means for automatically and periodically moving said pincher finger in and out of action.

4. In a can seaming machine, the combination of means for supplying the bodies and heads, a holding chuck, means for reciprocating the chuck to move a body and head into engagement, a seaming head against which said can parts are moved by the holding chuck, means for rotating the seaming head, an ejector ring on the seaming head, means for operating said ring to eject the seamed can, a seaming wheel with a plurality of successively acting tools thereon adapted to form the seam, means for mounting and rotating said seaming wheel and means for controlling the movement of the bodies and heads to and from the seaming station, said devices for controlling the movements of the bodies and heads comprising yielding means for tilting the can body during its movement into engagement with the head.

5. In a machine for attaching can heads to can bodies, the combination of a seaming head, a seaming tool coacting therewith, means for engaging the can body and its head with the seaming head, an ejector ring encircling the seaming head to dislodge the can and means for automatically operating the ejector ring.

6. In a machine for attaching heads to can bodies, the combination of a seaming head, a seaming tool coacting therewith, a holding chuck, means for reciprocating it toward and from the seaming head, a member yieldingly sustained on the holding chuck and adapted to be engaged by the can body and to yield before it as the body is advanced by the motion of the holding chuck, said yielding member on the seaming block consisting in an annulus encircling the block and springs connecting it therewith.

7. In a machine for attaching heads to can bodies, the combination of a seaming tool, a seaming head having an anvil surface against which the tool operates and adapted to be engaged by the can parts, an ejector ring coacting with the seaming head to dislodge the can and a means for automatically operating the ejector.

8. In a machine for fixing heads to can bodies, the combination of a circular seaming head and adapted to be engaged by the can head and body, a rotatable seaming tool coacting therewith, means for rotatably mounting the head, an ejector ring encircling the seaming head and means for automatically operating the ejector to dislodge the can.

9. In a machine for double seaming can heads and bodies the combination of a rotatable seaming wheel provided with tool elements for bending in the flange of the head against the flange of the body, and means on said wheel in advance of said tool elements and movable with relation to said elements in the axial direction of the body for initially bending a portion of the flange of the head to prepare it for the operation of the tool elements.

10. In a machine for double seaming can heads and bodies, the combination of a rotatable seaming wheel, tool elements on said wheel for bending the flange on the head against the flange on the body, and a finger on said wheel in advance of said tool elements arranged to initially bend a portion of the flange on the head against the flange on the body, to prepare the head flange for the operation of the tool elements.

11. In a machine for double seaming the heads to can bodies, the combination of a seaming wheel having a tool on its periphery to bend in the flange of the head against the flange of the body and a device carried by said seaming wheel and immediately preceding said tool thereof to initially bend the flange and start the operation of said bending tool, said means comprising a pincher finger movably mounted on the seaming wheel and devices for automatically throwing it into operation.

12. In a machine for double seaming can heads to their bodies, the combination of a seaming wheel having a bending tool thereon to bend the flange of the head against the flange of the body, a slide mounted to move radially on the seaming wheel, means for so moving the slide as it approaches the seaming station, a pincher finger mounted on the slide to engage and bend said head-flange, preparatory to the operation of said bending tool and means for automatically actuating said pincher finger.

13. In a machine for double seaming can heads to their bodies, the combination of a seaming wheel having a bending tool thereon to bend the flange of the head against the flange of the body, a slide mounted to move radially on the seaming wheel, means for so moving the slide as it approaches the seaming station, a pincher finger mounted on the slide to engage and bend said head-flange, preparatory to the operation of said bending tool and means for automatically actuating said pincher finger, the said means for radially moving the slide being operative during the operation of the pincher finger, whereby said finger simultaneously bends and draws outward the head-flange.

14. In a machine for double seaming can heads to their bodies, the combination of a seaming wheel having a plurality of seaming tools thereon in fixed relation to each other, whereby the flange of the can head is first bent against the flange of the can body and subsequently the three thicknesses bent down against the can body in a double seam, a backing tool adapted to bear under said three thicknesses of metal during a period of the bending operation and means for automatically moving said bending tool in and out of operation.

15. In a machine for affixing flanged can heads to the flanged bodies, the combination with the seaming mechanism of means for moving the heads and bodies into engagement and means for tilting the body during the period of its engaging movement.

16. In a machine for affixing flanged can heads to flanged bodies, the combination with the seaming mechanism of means for moving the heads and bodies into engagement and yieldingly held means for tilting the body during the period of its engaging movement.

17. In a machine for affixing can bodies to their heads, the combination with the seaming mechanism and a means for moving the body into engagement with the head, of two controlling members adapted to regulate the movement of the can body, means for yieldingly connecting said members out of line with each other, for the purpose specified, and means for allowing said members a step by step motion under the force of gravity of the cans.

18. In a machine for affixing can heads to their bodies, the combination with the seaming means and devices for moving the can bodies into engagement with the heads, of a rotary shaft, two star wheels thereon, of which one is fixed and the other rotatable on the shaft, a disk fastened to the shaft, a spring connecting the disk and the second named star wheel yieldingly to hold this star wheel in advance of the first-named star wheel, for the purpose specified, and means for allowing said shaft a step by step motion.

19. In a machine for attaching heads to can bodies, the combination of a seaming head, a seaming tool co-acting therewith, a holding chuck adapted to enter the end of the can body to center the can, means for reciprocating said chuck toward and from said head to introduce said chuck into and remove the chuck from said can body, and a gripping member yieldingly mounted on said chuck adapted to yieldingly engage the can body to grip the body between said seaming head and said member.

20. In a machine for the manufacture of tin cans, the combination of means for engaging and holding the can body and head, a rotatable seaming element for seaming the body and head together, said seaming element comprising a plurality of tools for performing the successive seaming operations, a compression tool on said seaming element and means for forcing said compression tool outwardly with relation to the seaming tool and against the body and head seam for compressing the seam after the successive seaming operations have been performed.

21. In a machine of the character disclosed, the combination of a seaming head, a seaming tool coacting therewith, a holding chuck, means for reciprocating said chuck toward and away from said head, said chuck comprising two members, a centering member and a gripping member, said centering member being adapted to enter the open end of the can body to center the can, said gripping member being adapted to engage the end of the can body to grip the body between it and said head, said centering and gripping members being yieldingly mounted with relation to each other so as to yield independently of each other in the axial direction of the chuck upon coming into contact with the can body.

22. In a machine of the character disclosed, the combination of a seaming head, a seaming tool coacting therewith, a holding chuck, means for reciprocating said chuck toward and away from said head, said chuck comprising two members, a centering member and a gripping member, said centering member being adapted to enter the open end of the can body to center the can, said gripping member being adapted to engage the end of the can body between it and said head, said centering member being yieldingly mounted upon said reciprocating means and said gripping member being yieldingly mounted on said centering member so that said members may yield in the axial direction of the chuck.

23. In a machine of the character disclosed, the combination of means for engaging and holding a can body and its head, a seaming tool for seaming the body and head and a spring pressed member mounted on said tool for compressing the seam after the seaming operation has been completed.

24. In a machine for affixing can heads to their bodies, the combination with the seaming mechanism, of means for controlling the feeding movement of one end of the can bodies and the heads, means for controlling the feeding movement of the other end of the bodies so that the body will rest at an inclination to the head, means for yieldingly connecting said controlling means together so that one may have a limited movement with respect to the other to facilitate the introduction of the end of the body into the groove on the head, means for allowing a step by step movement of both of said controlling means, and means for moving the can body and head into engagement.

25. In a machine of the character disclosed, the combination with a seaming mechanism of a rotatable engaging element for engaging one end of the can bodies and the can heads, a rotatable engaging element for engaging the other end of the can bodies so that the body will rest at an inclination to the head, said engaging elements being mounted to rotate slightly with relation to each other to bring the can body into alinement with the can head, means for introducing the end of the can body into said head during relative movement of said engaging elements, and means for intermittently rotating said engaging elements so as to bring said elements successively into receiving, seaming and discharging positions.

FRANZ BRUCKMANN, JR.,
OTTO DEMPEWOLF.

Witnesses to the signature of Franz Bruckmann, Jr.:
W. HEYDECKE,
WILH. HINKEL.

Witnesses to the signature of Otto Dempewolf:
A. ROTHENBERG,
JOHANN OLIVET.

Copies of this patent may be obtained for five cents each, by addressing the "Commissioner of Patents, Washington, D. C."